Figure 1:
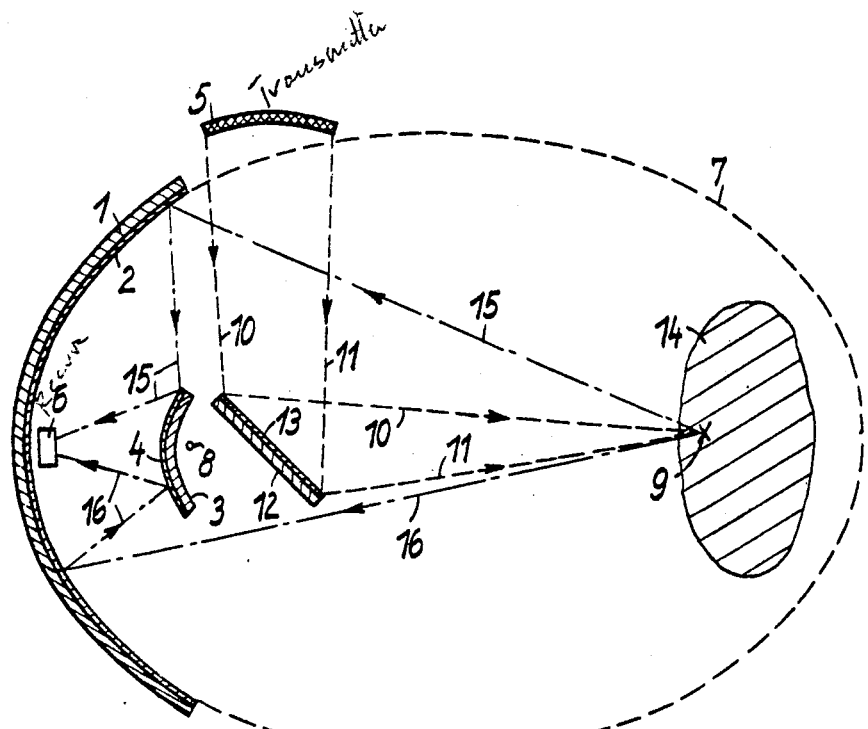

3,251,219
TRANSCEIVING ULTRASONIC IMPULSES IN MEDICAL DIAGNOSTICS
Carl Hellmuth Hertz, Lund, and Sven Olofsson, Vellinge, Sweden, assignors to Siemens-Reineger-Werke Aktiengesellschaft, Erlangen, Germany, a corporation of Germany
Filed June 26, 1962, Ser. No. 205,361
Claims priority, application Germany, July 5, 1961, S 74,651
4 Claims. (Cl. 73—67.7)

The invention disclosed herein is concerned with an ultrasonic-optical system for transmitting and receiving (transceiving) ultrasonic impulses, which system is intended for use in connection with medical ultrasonic diagnostics according to the impulse echo method.

In such diagnostic method, the part of the body which is to be examined, for example, in diagnosing a heart condition, the upper part of the body, is irradiated with ultrasonic impulses of an ultrasonic transmitter-receiver, briefly referred to as transceiver, which is arranged for swinging or pivotal motion about the body, and the echo impulses reflected from homogeneous areas, so-called structures, are for evaluation and picturing conducted to an electron beam tube. A normal ultrasonic transducer, such as is also employed for therapeutic purposes, is being used in connection with the customary practice for transmitting and for receiving purposes.

Sundry difficulties have to be overcome in connection with ultrasonic diagnosis, which can only be indicated here in general manner. One of these difficulties resides in that ultrasonic impulses are relatively strongly absorbed by biologic tissues while they are only relatively weakly reflected by the tissue structures which are of interest, owing to the fact that the wave resistance differential between the border areas of such structures and the remaining tissue is very small. The use of a common transducer for transmitting and for receiving purposes offers a possibility of using an expedient for obtaining useful echo impulses lying above the input noises of the receiver amplifier, namely, to employ high ultrasonic impulse intensities and large area transducers. These two expedients are however attended by other disadvantages.

An increase of the impulse intensity generally causes a prolongation of the ultrasonic impulses since the damping of the oscillator in the transducer cannot be increased as desired. This in turn reduces the resolution power of the system in the direction of the ultrasonic beam.

An increase in the size of the diameter of the transducer impairs the lateral resolution, since only such structural differences can be comprehended which have transversely of the ultrasonic beam direction a spacing corresponding at least to the diameter of the transducer. Accordingly, the lateral resolution is the poorer the larger the diameter of the transducer.

However, a poor lateral resolution is also caused by another condition. Owing to the strong absorption of the ultrasonic waves in biologic tissues, the highest applicable ultrasonic frequency amounts to about 2 megacycles, which corresponds to a wavelength of about 0.75 millimeter. This wavelength is on the same order of magnitude as the fine constituents of the structure which is to be examined and is, moreover, only one order of magnitude smaller than the diameter of the transducer.

This means, on the one hand, that the ultrasonic beam cannot be as sharply focused as desired, and on the other hand, that the echo formation in the tissue is frequently effected as a scattering rather than as reflection in the true sense. These two factors necessarily produce a poor lateral resolution of the ultrasonic picture.

Another disadvantage of the known methods operating with a common ultrasonic transceiver resides in the possibility of producing socalled ghost pictures, the appearance of which is substantially occasioned by the fact that a part of the ultrasonic echo does not run from the reflecting structure directly back to the transducer but first to a second structure lying laterally of the first named structure. The echo is thus again reflected at the second structure from which it runs back to the transducer. Such twice reflected echo results in patterns appearing in the ultrasonic picture, which are difficult to interpret.

The object of the present invention resides in providing an ultrasonic-optical system which is free of the above noted disadvantages. The proposed system employs in part a previously suggested concave mirror-like device for receiving the reflected impulses.

The ultrasonic-optical system according to the invention comprises a rotation symmetrical arcuate member of a rotation ellipsoid, the concave inner wall of said member being adapted for ultrasonic reflection, an ultrasonic receiver disposed in the symmetry axis near the inner wall of said member, an arcuate rotation hyperboloid spaced apart from and facing with its convex wall the inner concave wall of said rotation symmetrical member, an ultrasonic transmitter for producing a radiation pattern which converges in a focal point at an object which is being examined, said above named components being in known manner mutually arranged and geometrically dimensioned so that the converging radiation of the ultrasonic transmitter extends, directly or with the aid of known deflection means, in direction of the symmetry axis of said rotation symmetrical ellipsoid member, the focal point of said transmitted radiation being in alignment with a second focal point of said rotation symmetrical member, echo impulses reflected from said object lying at said first named focal point being first reflected at the inner concave wall of said rotation symmetrical member and being directed therefrom onto the convex wall of rotation hyperboloid from which they are reflected onto said ultrasonic receiver.

The invention will now be explained more in detail with reference to the accompanying drawing showing two embodiments thereof.

Figure 2:
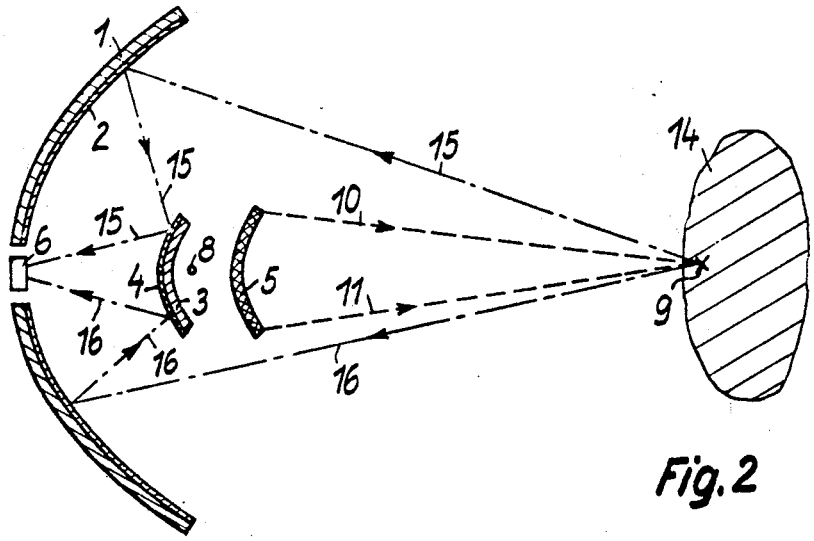

FIG. 1 illustrates an embodiment comprising deflection means for focusing the radiation of the ultrasonic transmitter, in a converging pattern, to the structure which is to be examined; and FIG. 2 represents an embodiment in which the converging radiation of the ultrasonic transmitter is directly extended to the structure to be examined, and also showing a placement of the ultrasonic receiver which differs from that indicated in FIG. 1.

Identical parts are in both figures identically referenced.

The illustrated ultrasonic-optical system comprises an arcuate rotation symmetrical member 1 having a reflecting concave inner wall 2, a rotation hyperboloid 3 having a convex reflecting wall surface 4, an arcuate transmitter quartz 5, and a receiver quartz 6. The reflecting walls 2 and 4 may be constructed of any suitable material, as for example, of the type illustrated in U.S. Patent 2,411,- 537, employing galvanized iron sheet which may be mounted on material such as felt or the like. The rotation symmetrical member 1 is part of an incomplete rotation ellipsoid 7 which is indicated in FIG. 1 by a dash line. This rotation ellipsoid has two focal points 8 and 9. The parts 1 and 3 are mutually so arranged that the reflecting layers 2 and 4 are oppositely positioned and that the epicenter of the rotation hyperboloid 3 coincides with the second focal point 8 of the ellipsoid member 1.

The transmitter quartz 5 and the receiver quartz 6 are in known manner respectively connected with a high frequency generator and oscillograph amplifier which have been omitted in the drawing for the sake of simplicity.

The receiver quartz 6 may be disposed on the inside of the rotation symmetrical member 1 near the inner concave wall thereof, as shown in FIG. 1, or may be set back in a recess or opening in the member 1 as shown in FIG. 2.

The radiation of the ultrasonic transmitter 5, which converges as indicated by the dash lines 10 and 11, is in the embodiment shown in FIG. 1 extended along the symmetry axis of the system with the aid of a plane deflection mirror 12 having a reflection layer 13 similar to the layers 2 and 4, while being extended directly along such symmetry axis as shown in FIG. 2. The ultrasonic transmitter oscillator 5 must at any rate be so arranged and must be with respect to the convergence of the radiation so constructed, that the focal point 9 of the radiation is in alignment with the second focal point 8 of the ellipsoid or the rotation symmetrical ellipsoid 1.

The entire arrangement or system together with the object 14 which is to be examined can be disposed in a vessel containing a fluid which is a good conductor for ultrasonic radiation. It is however also possible to position the parts 1–5 together with the deflection mirror 12, if such mirror is employed, in a closed chamber filled with fluid which is a good conductor for the ultrasonic radiation, such chamber being in the direction toward the object 14 elastically delimited and directly or if desired over known coupling means, in engagement therewith. The arrangement is to be in both cases so that the structure of the object 14 which is of interest, is within the range of the focal point 9.

The echo pulses which are produced by the structure of the object 14 which is of interest, are first intercepted by the rotation symmetrical ellipsoid member 1, as indicated by dot-dash lines 15 and 16, and are thereby reflected to its focal point 8. They are thereupon along such path intercepted by the outer convex surface 4 of the hyperboloid 3 and thereby reflected toward the receiver 6. The geometrical-optical laws for calculating the required curvature radii, etc., of the individual components, are known and explanations with respect thereto are therefore omitted.

In order to obtain a two-dimensional cross-sectional picture of the body 14, the entire ultrasonic-optical system is by suitable and known means swung or pivotally moved about so that the continuation of the symmetry line extending through the focal points 8 and 9 sweeps over the entire body 14. A cross-sectional picture of the body part which is being examined will be obtained by utilizing the echo impulses in known manner for modulating the brightness of an electron beam which is deflected synchronously with the impulse timing, and controlling the beam deflection in the other deflection direction of the respective electron beam oscillograph by the pivotal or swinging motion of the system.

It will be apparent that only echo impulses can reach the receiver 6, in the ultrasonic-optical system according to the invention, owing to the geometrical-optical conditions provided thereby, which are released directly by a structure lying at or near the focal point 9. This is one factor for the high lateral resolution effected by the invention.

The high lateral resolution is in addition secured by the size of the receiver quartz 6 which can be made small as compared with the large receiving surface of the ellipsoid member 1. This also results in good receiving sensitivity of the arrangement, permitting in given cases a lower loading of the transmitter which in turn improves the resolution in the radiation direction.

Another advantage of the present ultrasonic-optical system resides in the fact that the reflecting structure need not be positioned accurately perpendicularly with respect to the direction of incidence of the ultrasonic radiation since it is entirely sufficient that the echo impulses impact the inner wall 2 of the ellipsoid member of some desired points thereof.

A further particular advantage resides in the fact that so-called ghost pictures are reliably avoided since only echo impulses coming from the focal point 9 can reach the receiver.

The ultrasonic-optical system according to the invention also offers the possibility of using, if desired, a relatively powerful ultrasonic transmitter, since such transmitter can be positioned, upon using a deflection mirror 12, outside of the receiving system proper, thus providing ample space for the relatively large size thereof.

Changes may be made within the scope and spirit of the appended claims which define what is believed to be new and desired to have protected by Letters Patent.

We claim:

1. For use in medical ultrasonic diagnostics according to the impulse-echo method, an ultrasonic-optical system for transmitting ultrasonic impulses to an object which is being examined and for receiving ultrasonic echo impulses reflected from the object, said ultrasonic-optical system being formed as apart of a rotation ellipsoid in the first focal point of which may be arranged the object to be examined, said system comprising, means for producing an ultrasonic wave bundle which converges with respect to the first focal point lying in the object and the central beam of which coincides with an imaginary straight line extending between the two focal points of the rotation ellipsoid, a first reflector for receiving the diverging ultrasonic echo-wave bundle emanating from the first focal point of the rotation ellipsoid, said first reflector being formed as a pole cap of the rotation ellipsoid and being disposed adjacent to the second focal point of the rotation ellipsoid, the concave inner face of said pole cap being made of material which reflects the ultrasonic waves, operative to reflect the diverging echo wave bundle, as a convergent ray bundle, to the second focal point of the rotation ellipsoid, a second reflector which is curved rotation-hyperbolic and arranged within the rotation ellipsoid, with its generation focal point coinciding with the second focal point of the rotation ellipsoid said second reflector being smaller in size than said first reflector so that it shields the latter only partially against the diverging ultrasonic echo wave bundle which emanates from the first focal point of the rotation ellipsoid, and an ultrasonic sound receiver which is arranged in the converging ultrasonic echo wave bundle emanating from the second reflector.

2. A system according to claim 1, wherein the means for producing a converging ultrasonic wave bundle comprises an arcuately curved ultrasonic transmitter disposed outside the rotation ellipsoid and a plane mirror adapted to reflect ultrasonic waves, upon which mirror is directed the converging sonic wave bundle of the transmitter, said mirror being arranged between the focal points of the rotation ellipsoid and inclined with respect to the imaginary straight line extending between such focal points, whereby the converging sonic wave bundle is directed to the first focal point of the rotation ellipsoid, with the arrangement being such that the sum of the spacings between the transmitter and the mirror as well as between the mirror and the first focal point of the rotation ellipsoid corresponds to the curvature radius of the curved transmitter.

3. A system according to claim 1, wherein the ultrasonic receiver is arranged between the pole cap and the second focal point of the rotation ellipsoid.

4. A system according to claim 3, wherein the ultrasonic receiver is arranged within a recess formed in said rotation ellipsoid centrally thereof.

References Cited by the Examiner

UNITED STATES PATENTS

| 2,228,024 | 1/1941 | Abrahams | 340—8 |
| 2,763,153 | 9/1956 | Simjian | 73—67 |
| 2,798,961 | 7/1957 | Wormser | 88—57 |
| 3,066,569 | 12/1962 | MacDonald | 88—20 |
| 3,114,910 | 12/1963 | Rymes. | |

LEO SMILOW, *Primary Examiner.*

RICHARD C. QUEISSER, *Examiner.*